Figure 2:
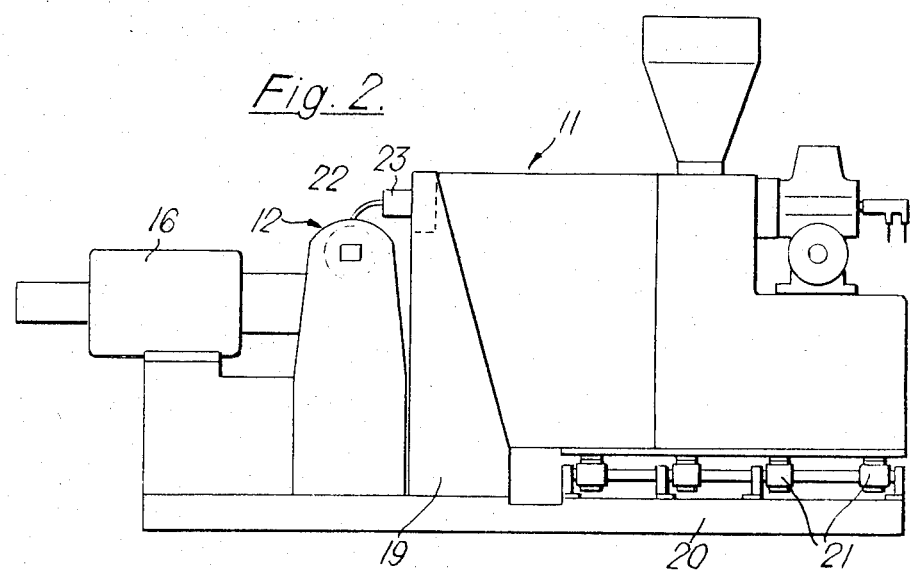

United States Patent [19]
Gallard et al.

[11] 3,806,569
[45] Apr. 23, 1974

[54] PROCESS FOR PRODUCING A CELLULAR POLYMERIC EXTRUDATE OF UNIFORM CROSS-SECTIONAL AREA

[75] Inventors: Henry Emile Gallard, Perivale; Geoffrey Alfred Layzell Ward, London; Barry George Howell, High Wycombe; Alan Harvey Hill, Darlington, all of England

[73] Assignees: British Insulated Callender's Cables Limited, London; General Engineering Company, Radcliff, Manchester, both of, England

[22] Filed: June 17, 1970

[21] Appl. No.: 46,885

[30] Foreign Application Priority Data
June 18, 1969  Great Britain..................... 30876/69

[52] U.S. Cl.................. 264/50, 264/40, 264/47, 264/174, 264/176 R, 264/DIG. 13, 425/4, 425/145, 425/149
[51] Int. Cl...................... B29d 23/05, B29d 27/00
[58] Field of Search............ 264/53, 51, 54, 40, 50, 264/47, 176 R, 174, DIG. 13; 618/12 SS, 12 SN, 12F; 425/4, 145, 149

[56] References Cited
UNITED STATES PATENTS

| | | | |
|---|---|---|---|
| 3,253,065 | 5/1966 | Hansen......................... | 18/12 SN X |
| 3,251,911 | 5/1966 | Hansen......................... | 18/12 SN X |
| 3,148,231 | 9/1964 | Spencer........................ | 18/12 SS X |
| 2,836,851 | 6/1958 | Holt.............................. | 18/12 SS |
| 2,669,751 | 2/1954 | McCurdy...................... | 18/12 SN X |
| 3,393,260 | 7/1968 | Miler............................. | 18/12 SN X |
| 2,987,774 | 6/1961 | Jacobson...................... | 18/12 SN X |
| 3,287,477 | 11/1966 | Vesilind......................... | 18/12 S N |
| 3,624,025 | 11/1971 | Twist............................. | 264/174 X |
| 3,728,056 | 4/1973 | Theysohn...................... | 425/145 X |

OTHER PUBLICATIONS

Bernhardt, Ernest C., Edt. "Processing of Thermoplastic Materials", New York, Reinhold, c 1959, pp. 243–248.
Kirby, Russell B. "An Analysis of Surging in Screw Extruders; Process Dynamics of Screw Extruders," In SPE Journal, Oct. 1962, pp. 1273–1281.
Krueger, W. L. "Experimental Illustrations of Dynamic Extrusion Theory," In SPE Journal, Oct. 1962, pp. 1282–1287.

*Primary Examiner*—Philip E. Anderson
*Attorney, Agent, or Firm*—Webb, Burden, Robinson and Webb

[57] ABSTRACT

In the production of extruded cellular polymeric material, for instance as a layer on a travelling wire, by feeding polymeric material under pressure in a viscous or fluid state into the inlet end of a screw extrusion machine having a gas injection zone followed by an extrusion zone, the location in the extruder barrel of the transition between the part that is partly filled by the polymeric material and the part that is fully filled is determined by measurement of pressure, in the extruder barrel, and the relationship between the rate of feed of polymeric material into the extruder and the speed of the extruder is controlled to stabilise the position of the transition in accordance with said measurement. Apparatus for use in the method includes two independently driven screw extrusion machines, the first of which feeds polymeric material into the second at a rate controlled in accordance with the measurement of said pressure in the second machine.

3 Claims, 4 Drawing Figures

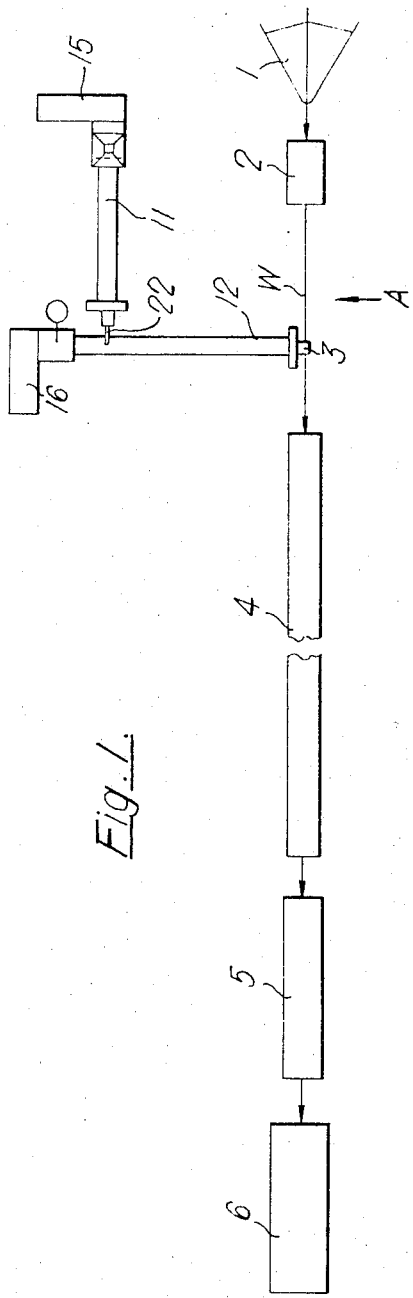
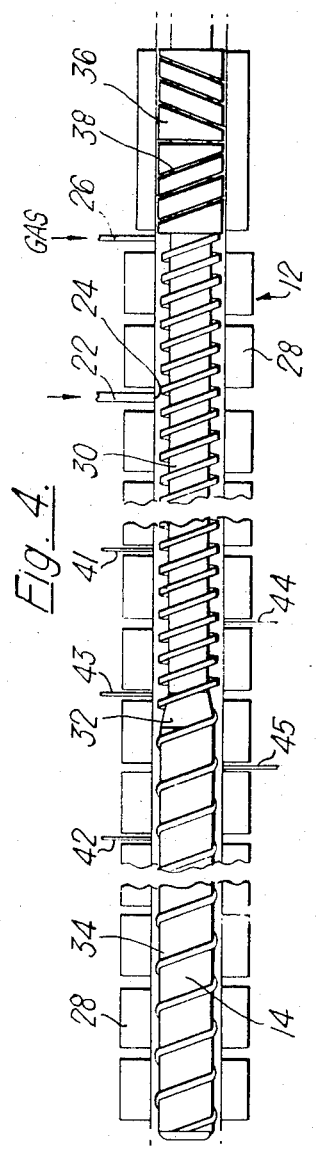

PROCESS FOR PRODUCING A CELLULAR POLYMERIC EXTRUDATE OF UNIFORM CROSS-SECTIONAL AREA

This invention relates to an extrusion process for producing cellular polymeric material and to apparatus for use in the process. The term "polymeric material" as used herein includes thermoplastics, elastomers and thermosetting plastics. The process is of the kind in which the material in the viscous or fluid state is subjected to gas under pressure in a zone of a screw extrusion machine which is only partly filled with the material, to cause sufficient gas to dissolve throughout the material, and the material in which the gas is dissolved is advanced through a substantially fully filled zone of the machine and then extruded through a die, whereupon the dissolved gas is liberated and the material expands to form the cellular structure.

It has been proposed to use for such a process a screw extrusion machine having three zones, a first zone in which the material is worked and advanced to a second, partly-filled zone (hereinafter referred to as the "gas injection zone"), in which it is subjected to gas pressure and then advanced to a third substantially fully-filled zone (hereinafter referred to as the "extrusion zone") from which it is extruded, the second zone of the screw of the extrusion machine having a smaller root diameter than that of the first and third zones. The use of such apparatus for the process has the disadvantage that it is difficult to control the rate of flow of the material from zone to zone, and consequently to obtain an extrudate of uniform cross-sectional area, and it is an object of the present invention to overcome this disadvantage.

The extrusion process in accordance with the invention comprises: feeding polymeric material under pressure in a viscous or fluid state into the inlet end of a screw extrusion machine having a gas injection zone in which the polymeric material is subjected to gas under pressure followed by an extrusion zone from which it is extruded through a die; determining the location in the barrel of the extrusion machine of the transition between the part that is partly filled by the polymeric material and the part that is substantially fully filled by the polymeric material by measurement of the pressure of the gas and/or polymeric material at a point or points in the extruder barrel at or near the desired location of the transition; and controlling the relationship between the rate of feed of polymeric material into the extruder and the speed of the extruder to stabilise the position of the transition in accordance with said measurement.

The polymeric material is preferably fed into the extrusion machine from another screw extrusion machine and the relationship between the rate of feed and the speed of the extruder is preferably controlled by adjusting the speed of the screw of this other machine either manually or automatically in accordance with the pressure measured. Alternatively this relationship may in some instances be controlled by adjusting the speed of the extruder into which polymeric material is being fed, thereby varying the output of the extruder, and in this case where the cellular polymeric material is being extruded on to a wire advancing in the direction of its length it will be necessary to effect also appropriate adjustment to the speed of travel of the wire.

The invention includes apparatus for carrying out the extrusion process comprising two independently driven screw extrusion machines, means for feeding the polymeric material in a viscous or fluid state from the outlet end of one of the machines (the first machine) into the inlet end of the other machine (the second machine), means for supplying gas under pressure to the inlet end of the second machine, sealing means at the inlet end of the screw of the second machine for substantially preventing the loss of gas and polymeric material, means for measuring pressure in the barrel of the second machine at or near the transition between a gas injection zone and an extrusion zone, and means for controlling the speed of the first machine in accordance with said condition or conditions.

In the apparatus in accordance with the invention, the first extrusion machine is preferably mounted with the outlet end of its barrel or of an extension thereof anchored to the inlet end of the second machine and the remainder of its barrel so mounted that it can move under thermal expansion towards and away from the second machine. The inlet end of the barrel of the first machine may, for example, be mounted on sliding bushes carried on the frame on which the second machine is mounted and to which the outlet end of the first machine is anchored. Alternatively, the inlet end of the barrel of the first machine may be mounted on a carriage movable along a track.

We prefer to interconnect the barrels of the first and second machines by means of a bent pipe connection which is of sufficient length to be flexible enough to accommodate expansion in itself and in any parts of each of the barrels that are free to expand towards the other barrel but which is sufficiently short to prevent excessive pressure build-up within itself or within the first machine. It is important that the pipe should have a small volume as possible and should by its inherent properties, or by the provision of ancillary temperature control means, be capable of remaining at a substantially constant temperature during the process.

An alternative method of interconnecting the two machines is to couple the outlet end of the barrel of the first machine rigidly to the inlet end of the barrel of the second machine and, for example, to mount the other (free) ends of the barrels of both machines on sliding bearings or on carriages movable along tracks. The method using a short bent pipe has the advantage that the machines can be mounted with their axes in spaced parallel planes in such a way as to leave free access to both ends of each machine.

The means for measuring the pressure conditions in the barrel of the second extruder at or near the transition between the gas injection zone and the extrusion zone may, for example, consist of a pressure transducer or transducers.

A method of and apparatus for controlling automatically the rate of feed of polymeric material into a screw extrusion machine in accordance with the internal pressure at one or more points along the barrel of the machine are the subject of co-pending Application No. 42224/69 filed on 25th Aug., 1969.

The invention also includes a method of providing a wire advancing in the direction of its length with a layer of cellular polymeric material in which the layer of cellular polymeric material is extruded on to the wire by the method or apparatus of the present invention. It is to be understood that the term "wire" as used herein is intended to include both a bare wire or an assembly of bare wires and a wire or assembly of wires having a covering layer of polymeric material.

The invention will be further illustrated by a description by way of example and with reference to the accompanying drawings of our preferred form of apparatus and of an extrusion process utilising the apparatus for extruding a layer of cellular polythene on to a wire advancing in the direction of its length.

Figure 3:
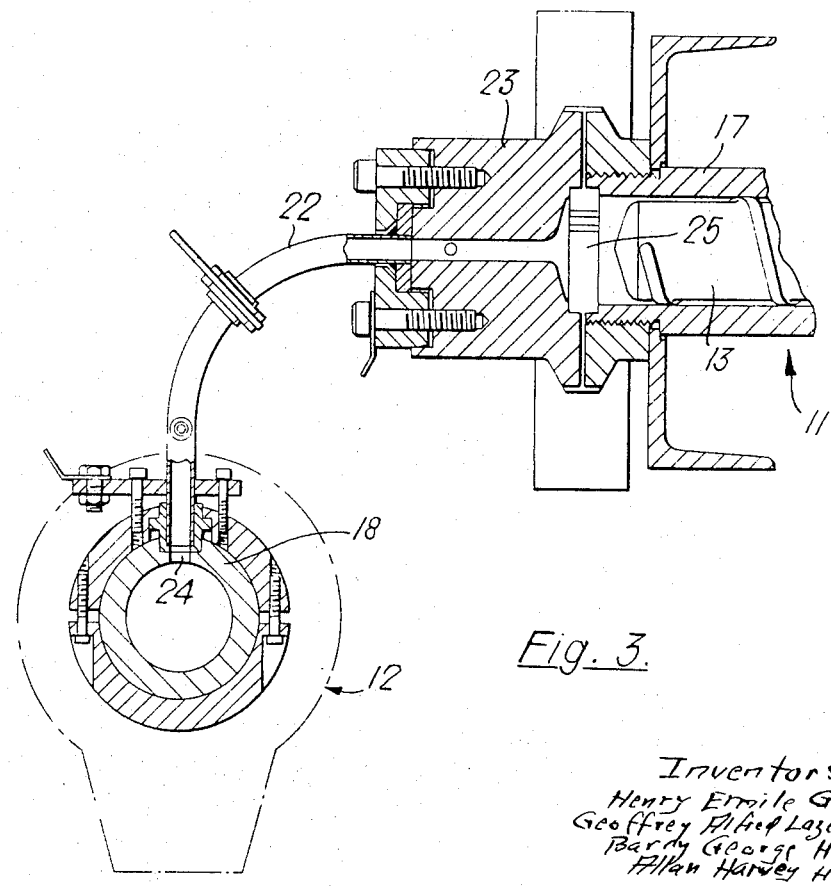

In the accompanying drawings:

FIG. 1 is a diagrammatic plan view of the layout of plant for use in the extrusion of a layer of cellular polythene on to a wire, which plant includes apparatus in accordance with the present invention, FIG. 2 is a diagrammatic fragmental side elevation of the apparatus looking in the direction of arrow A in FIG. 1, FIG. 3 is a sectional view illustrating the interconnection between the barrels of the two extruders of the apparatus, and FIG. 4 is a diagrammatic fragmental side view partly in section and partly in elevation of the barrel of the second extruder of the apparatus housing the preferred form of screw.

Referring to FIGS. 1 to 3 the plant comprises a pay off unit 1 from which wire W is drawn through a wire-preheating device 2 into the cross-head die 3 of the second of two screw extrusion machines 11 and 12, constituting apparatus in accordance with the present invention, where a layer of cellular polythene is applied to the wire. On emerging from the die 3 the cellular polythene-covered wire passes through a cooling trough 4 or other cooling device for cooling the extruded layer of cellular polythene and from the cooling trough the covered wire travels past or through several quality control instruments generally indicated at 5 and, for instance, comprising a capacitance monitor, diameter monitor, eccentricity gauge and high voltage fault detector. After passage through the quality control instruments 5 the coated wire is wound on a take-up drum 6 or is coiled in a container.

The two screw extrusion machines 11 and 12 constituting the apparatus of the present invention are independently driven by drive units 15 and 16. The first machine 11 is a conventional polythene extruder whose screw 13 has an L/D ratio (where L is the length of the screw and D is the external diameter of the screw thread) of 20:1. The function of the first machine 11 is to melt and blend the polymer and pump it at a controlled temperature to the second machine 12 which is mounted at 90° to the first machine and in which the gas is injected into the polymer.

Expansion of the barrel 17 of the first machine 11 under thermal expansion is accommodated by allowing for displacement of the complete machine with respect to the second machine 12. As will be seen on referring to FIG. 2 accommodation for such displacement is accomplished by rigidly fixing the outlet end of the barrel 17, by means of an anchor bracket 19, to a stationary base plate 20 for both machines, and allowing the body of the machine 11 to move on sliding bearings 21 in a direction away from the anchor bracket.

At the outlet end of the barrel 17 of the first machine 11 the melted polymeric material passes through a "pseudo head" 23 containing a breaker plate 25 and sieve packs (not shown). It then passes via a short bent pipe 22 into the barrel 18 of the second machine 12 through an inlet 24. The bent pipe 22 is long enough to give the pipe sufficient flexibility to allow for the small transverse expansion of the barrel 18 of the second machine 12 and axial expansion of the part of the first machine 11 between the anchor bracket 19 and the barrel 18 of the second machine but is not long enough to cause undue pressure build up in the first machine.

The screw 14 of the second machine 12, which is shown in FIG. 4 surrounded by heater zones 28, comprises a feed section 30 of sufficient length to allow for a high degree of gas/polymer surface contact, a short compression section 32, followed by a metering section 34 of sufficient length to enable a steady surge-free output of melted polythene to be attained. At the inlet end of the screw 14 is a conventional gas seal (not shown). An inlet 26 for gas, normally nitrogen, to be injected into the barrel 18 of the second machine is spaced downstream from the gas seal and upstream from the inlet 24 for the polymeric material to ensure that polymeric material does not flow back past the inlet 24 and possibly block the gas inlet. The amount of gas dissolved in the polymeric material will depend upon the injection pressure. The gas remains dissolved until the pressure is released at the exit of the die 3 (FIG. 1) of the second machine 12 when the gas will be liberated and expansion of the polymer will occur.

The part 36 of the screw 14 adjacent the gas seal has a diameter approximating to the bore of the barrel 18 and is provided with a narrow helical groove 38 in its surface whose lay is reversed between its ends to prevent oil lubricating the gas seal from working its way along the barrel. The helical groove 38 also presents a path of high resistance to any polymeric material which may accidentally run back beyond the gas inlet 26.

In operation, the speed of the screw 14 of the second machine 12 is adjusted to the output of the melted polythene required and after that is not altered.

For measuring pressure conditions in the barrel 18 of the second machine 12 at least two pressure transducers are positioned in the wall of the barrel at spaced locations along its length. For normal running conditions a first pressure transducer 41 is located in the gas injection zone approximately midway between the inlet 24 for the melted polymeric material and the compression section 32 of the screw 14 and a second pressure transducer 42 is located downstream of the compression section 32 approximately one third of the way along the extrusion zone. A third pressure transducer 43 may be located in the barrel 18 adjacent or downstream of the compression section 32 and, if desired, additional pressure transducers 44 and 45 may be located between each of the pressure transducers 41 and 42 and the compression section.

Under normal running conditions the gas injection zone of the screw 14 of the second machine is run partially full and this condition is maintained by the first pressure transducer 41 which indicates pressure within the gas injection zone. The speed of the screw 13 of the first machine 11 is adjusted as necessary to ensure that this condition always applies. The extrusion zone of the screw 14 is required to be substantially fully filled with polymeric material and this condition is indicated when the second pressure transducer 42 records that the pressure in the extrusion zone exceeds the pressure in the gas injection zone to a substantial extent. By way of example the ratio of pressure in the gas injection zone/pressure in the extrusion zone may lie in the range 1:6 to 1:8. The speed of the screw 13 of the first machine is also adjusted as necessary to ensure that this condition always applies.

Alternatively, the output of the first machine 11 can be controlled having regard to maximum and minimum pressure readings of the transducer 43 located adjacent or downstream of the compression section 32.

As previously mentioned more than two pressure transducers can be employed to measure pressure in the barrel of the second machine and a number of such devices can be spaced apart along the barrel at or near the desired transition position.

What we claim as our invention is:

1. An extrusion process for producing an extrudate of cellular polymeric material of uniform cross sectional area which comprises feeding polymeric material under pressure in a viscous or fluid state into the inlet end of the feed section of a screw extrusion machine having a gas injection zone in which the polymeric material is subjected to gas under pressure wherein the feed section is of sufficient length to allow for a high degree of gas/polymer surface contact followed by an extrusion zone from which it is extruded through a die; measuring the pressure at at least one point in the barrel of the extrusion machine close to the desired location of the transition between the gas injection zone and the extrusion zone; and increasing or decreasing the rate of feed of polymeric material into the extruder or the speed of the extruder or both in accordance with said measure to stabilize or maintain substantially constant the position of said transition.

2. An extrusion process as claimed in claim 1, wherein the polymeric material is fed into the extrusion machine from another screw extrusion machine.

3. An extrusion process as claimed in claim 2 wherein the speed of the screw of said other extrusion machine is adjusted in accordance with the pressure measured.

* * * * *